US010232518B2

(12) United States Patent
Inoue et al.

(10) Patent No.: US 10,232,518 B2
(45) Date of Patent: Mar. 19, 2019

(54) ROBOT PIVOT SHAFT STRUCTURE

(71) Applicant: FANUC CORPORATION, Yamanashi (JP)

(72) Inventors: Toshihiko Inoue, Yamanashi (JP); Masayoshi Mori, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 217 days.

(21) Appl. No.: 15/475,315

(22) Filed: Mar. 31, 2017

(65) Prior Publication Data
US 2017/0282382 A1 Oct. 5, 2017

(30) Foreign Application Priority Data

Apr. 4, 2016 (JP) .................................. 2016-075238

(51) Int. Cl.
B25J 9/10 (2006.01)
F16H 1/20 (2006.01)
(Continued)

(52) U.S. Cl.
CPC ............ *B25J 19/0029* (2013.01); *B25J 9/102* (2013.01); *B25J 17/00* (2013.01); *F16H 1/203* (2013.01); *Y10S 901/26* (2013.01); *Y10S 901/28* (2013.01)

(58) Field of Classification Search
CPC ........................... B25J 19/0029; B25J 19/102
See application file for complete search history.

(56) References Cited

U.S. PATENT DOCUMENTS 5,634,374 A    6/1997  Depietri
5,894,761 A *  4/1999  Danielsson ............ B25J 9/1005
                                                74/490.06
(Continued)

FOREIGN PATENT DOCUMENTS

EP    0621112 A     10/1994
EP    1 892 064 A1   2/2008
(Continued)

OTHER PUBLICATIONS

Japanese Office Action dated Mar. 27, 2018, in connection with corresponding JP Application No. 2016-075238 (6 pgs., including English translation).
(Continued)

Primary Examiner — Terence Boes
(74) Attorney, Agent, or Firm — Maier & Maier, PLLC

(57) ABSTRACT

Provided is a robot pivot shaft structure that includes a revolving drum rotatably supported at an upper portion of a base and that has a hollow portion, a drive motor rotating the revolving drum, and a speed reduction mechanism reducing the rotational speed of the drive motor. The speed reduction mechanism has a small gear fixed to a shaft of the drive motor, a large gear meshed with the small gear, an input hypoid gear fixed to the large gear, and an output hypoid gear meshed with the input hypoid gear. The output hypoid gear is fixed to the revolving drum and is disposed in the base. The input hypoid gear and the large gear are rotatably supported at the base. The drive motor is fixed to the base and disposed below the revolving drum, the position being horizontally shifted from vertically below the hollow portion.

6 Claims, 3 Drawing Sheets

(51) Int. Cl.
*B25J 17/00* (2006.01)
*B25J 19/00* (2006.01)

(56) References Cited

U.S. PATENT DOCUMENTS

| | | | |
|---|---|---|---|
| 9,321,179 B2* | 4/2016 | Inoue | B25J 17/02 |
| 2008/0056859 A1 | 3/2008 | Inoue et al. | |
| 2009/0017955 A1 | 1/2009 | Takeuchi | |
| 2012/0266720 A1 | 10/2012 | Oka et al. | |
| 2014/0137689 A1* | 5/2014 | Nogami | B25J 18/00 |
| | | | 74/490.05 |
| 2017/0291313 A1* | 10/2017 | Inoue | B25J 19/0029 |

FOREIGN PATENT DOCUMENTS

| | | |
|---|---|---|
| EP | 1 978 282 A1 | 10/2008 |
| EP | 2 357 380 A1 | 8/2011 |
| EP | 2 514 573 A1 | 10/2012 |
| JP | S60-143688 U | 9/1985 |
| JP | H02-097593 U | 8/1990 |
| JP | H05-104466 A | 4/1993 |
| JP | H06-143186 A | 5/1994 |
| JP | H07-108485 A | 4/1995 |
| JP | H07-269681 A | 10/1995 |
| JP | 2002-307369 A | 10/2002 |
| JP | 3483862 B | 10/2002 |
| JP | 2005-014103 A | 1/2005 |
| JP | 4326558 B2 | 6/2009 |
| JP | 2012-223850 A | 11/2012 |
| WO | WO2007/086476 A1 | 8/2007 |

OTHER PUBLICATIONS

Japanese Search Report dated Feb. 23, 2018, in connection with corresponding JP Application No. 2016-075238 (6 pgs., including English translation).
Japanese Search Report dated Mar. 1, 2018, in connection with corresponding JP Application No. 2016-075238 (5 pgs.).

* cited by examiner

ROBOT PIVOT SHAFT STRUCTURE

CROSS-REFERENCE TO RELATED APPLICATIONS

This application is based on Japanese Patent Application No. 2016-075238, the contents of which are incorporated herein by reference.

TECHNICAL FIELD

The present invention relates to a robot pivot shaft structure.

BACKGROUND ART

As a pivot-shaft structure for rotating a robot about a pivot shaft that is disposed in the vertical direction, as shown in FIG. 3, there is a conventionally known pivot shaft structure in which a reducer 50 having a hollow structure is fixed at an upper portion of a pivot-shaft base 51, and a driving force from a drive motor 52 that is disposed at a position offset in the horizontal direction from the center of the pivot shaft is transferred to the reducer 50 by using a pair of spur gears 53 and 54 (for example, see PTL 1). With this structure, a hollow portion 55 that extends vertically is secured in the vicinity of the center of the pivot shaft, thereby making it possible to facilitate handling of a wire body 56, such as a cable or a pipe, from the pivot-shaft base 51 to a robot body above the reducer 50.

CITATION LIST

Patent Literature

{PTL 1} Japanese Unexamined Patent Application, Publication No. Hei 7-108485

SUMMARY OF INVENTION

Technical Problem

An object of the present invention is to provide a robot pivot shaft structure capable of easily routing the wire body.

Solution to Problem

According to one aspect, the present invention provides a robot pivot shaft structure including: a base; a revolving drum that is supported at an upper portion of the base so as to be rotate about a vertical axis and that has a hollow portion in the vicinity of the vertical axis; a drive motor that rotates the revolving drum; and a speed reduction mechanism that transfers rotation of the drive motor to the revolving drum after reducing the rotational speed thereof, wherein the speed reduction mechanism is provided with a small gear that is fixed to a shaft of the drive motor, a large gear that is meshed with the small gear, an input hypoid gear that is fixed to the large gear, and an output hypoid gear that is formed of a ring gear meshed with the input hypoid gear; the output hypoid gear is fixed to the revolving drum and is disposed in the base; the input hypoid gear and the large gear are supported at a side portion of the base so as to rotate about a horizontal axis; and the drive motor is fixed to the base with being disposed at a position below the revolving drum, the position being shifted in the horizontal direction from a portion vertically below the hollow portion.

In the above-described aspect, the input hypoid gear and the large gear may be rotatably supported by the base by means of a support bearing; and the large gear may be disposed between a tooth section of the input hypoid gear and the support bearing.

In the above-described aspect, the large gear and the small gear may be spur gears.

In the above-described aspect, it is also possible to further include an opening for a wire body through which the wire body that is guided to the inside of the base via the hollow portion is led out from a side surface of the base to the outside.

In the above-described aspect, it is also possible to further include an opening for a motor through which the drive motor is taken in and out from the base, at the opposite side of the vertical axis from the opening for the wire body.

DESCRIPTION OF EMBODIMENT

A robot pivot shaft structure 1 according to one embodiment of the present invention will be described below with reference to the drawings.

Figure 1:
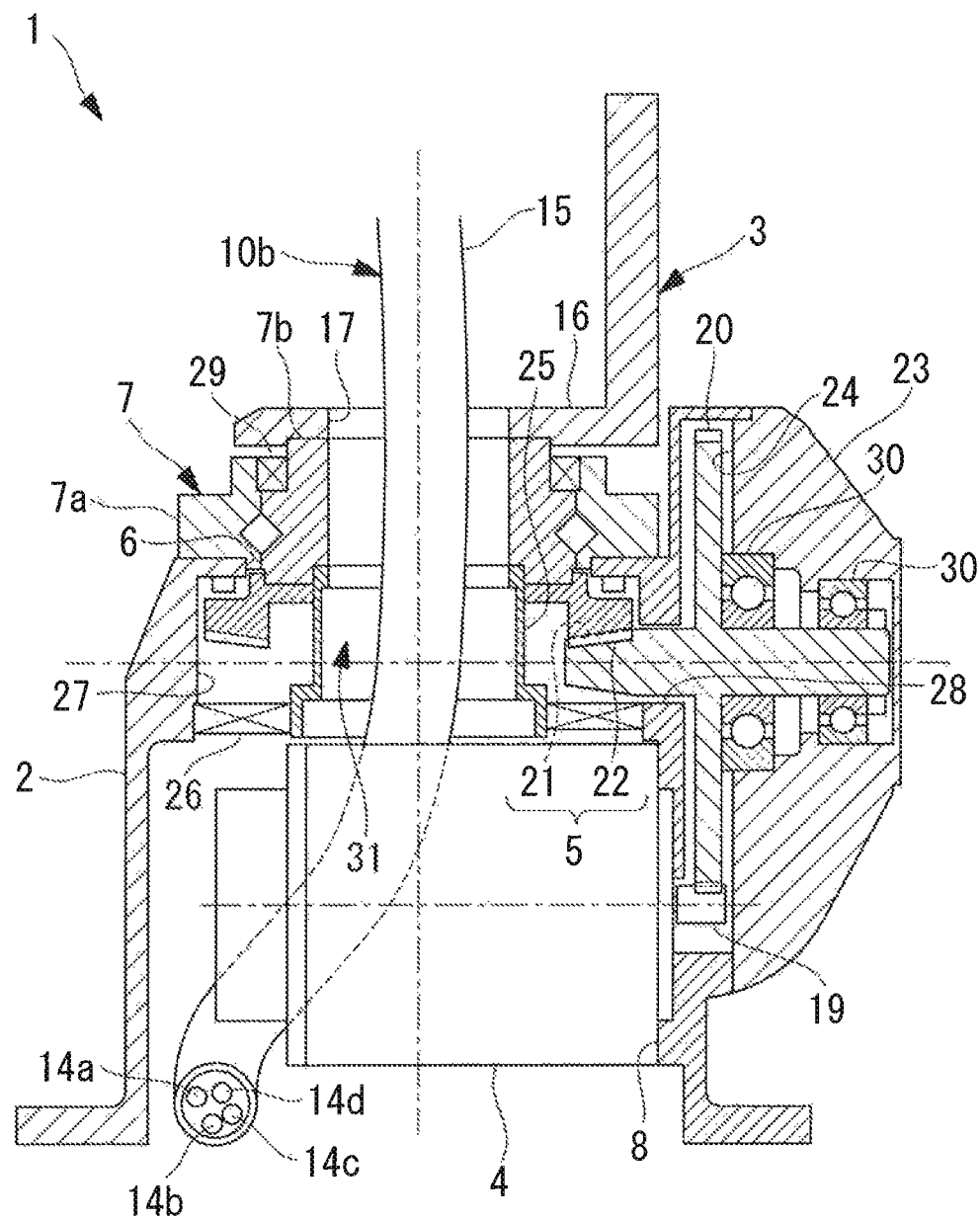
FIG. 1 is a longitudinal sectional view showing a robot pivot shaft structure according to one embodiment of the present invention.

As shown in FIG. 1, the robot pivot shaft structure 1 of this embodiment is provided with: a base 2 that is fixed to the ground; a revolving drum 3 that is supported at an upper portion of the base 2 so as to be capable of rotating about a vertical axis; a drive motor 4 that produces a driving force; and a speed reduction mechanism 5 that reduces the rotational speed of the drive motor 4 and transfers the reduced rotational speed to the revolving drum 3.

An outer ring 7a of a bearing 7 that supports the revolving drum 3 so as to be capable of rotating about the vertical axis (rotation center) is fixed in a through-hole 6 that is formed at an upper portion of the base 2.

Furthermore, the base 2 is provided with, on an inner surface side thereof, a motor attaching portion 8 in which the drive motor 4 is fixed and is also provided with: a motor opening 9 through which the drive motor 4 to be attached to the motor attaching portion 8 is taken in and out from the base 2; and a wire body opening 11a through which wires 10a and 10b are made to pass to the inside and the outside of the base 2.

Figure 2:
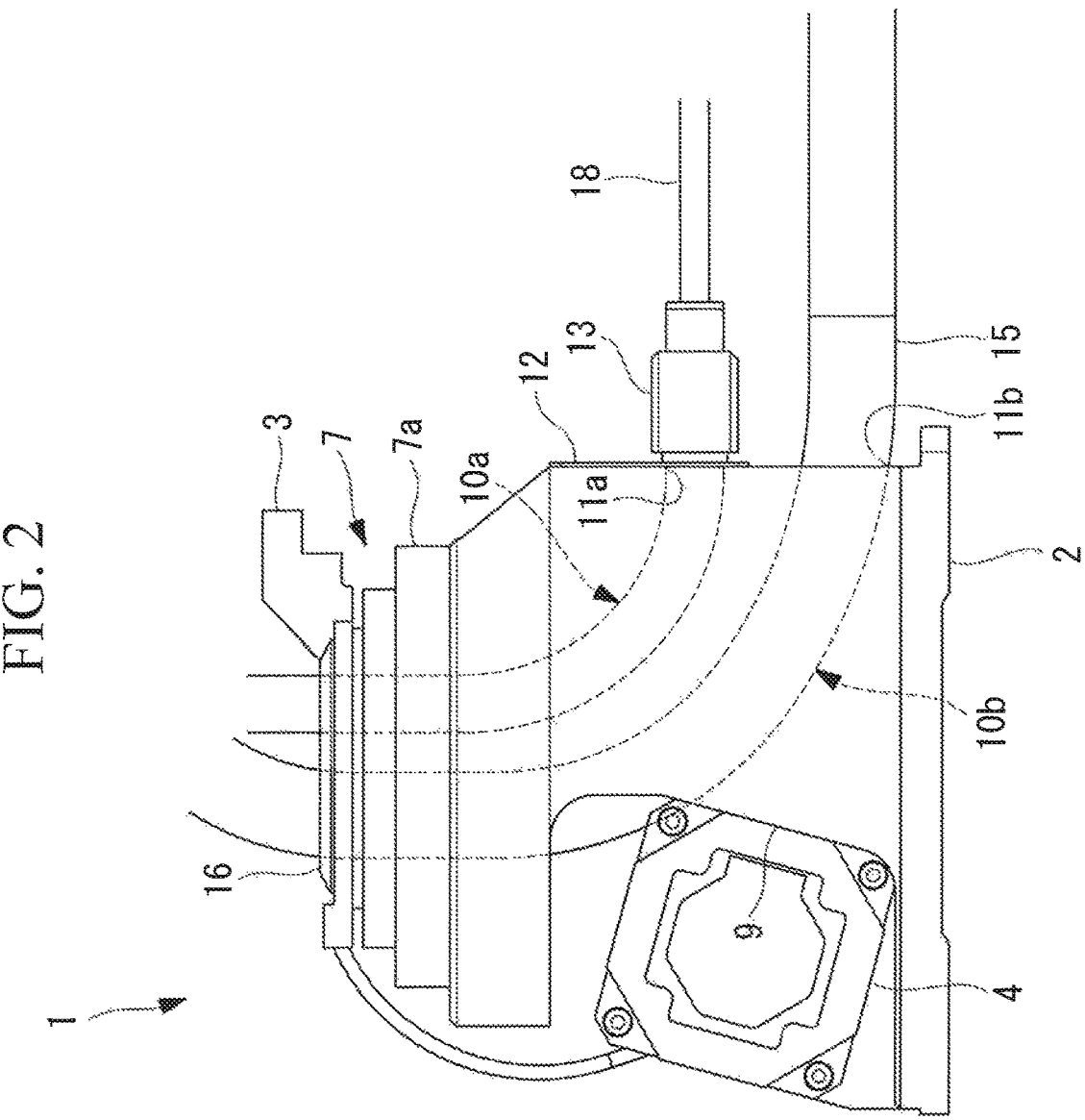
FIG. 2 is a partial side view for explaining wiring of wires in the robot pivot shaft structure shown in FIG. 1.
Figure 3:
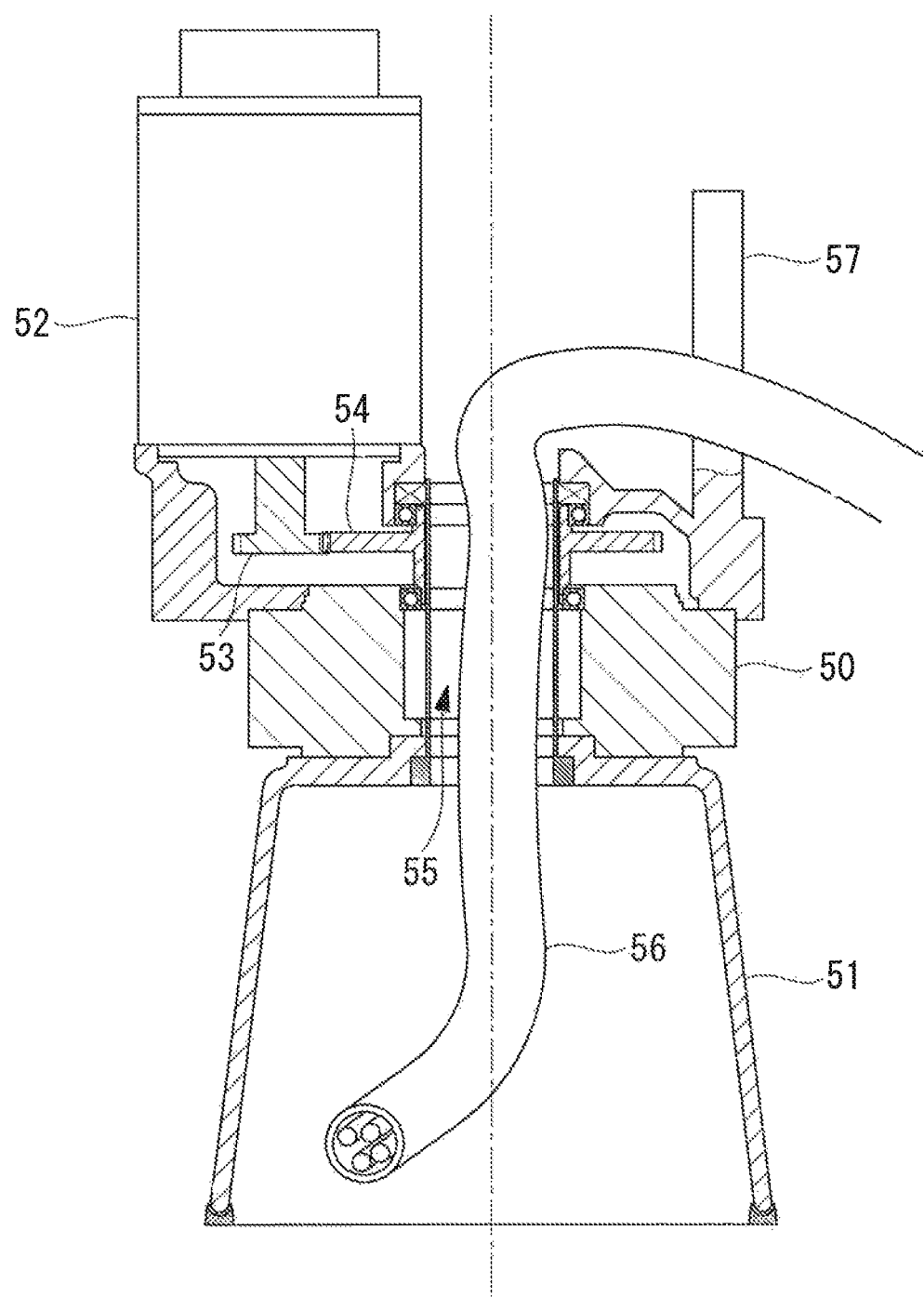
FIG. 3 is a longitudinal sectional view showing a conventional robot pivot shaft structure.

As shown in FIG. 2, the wire body opening 11a is provided in one side surface of the base 2, and the motor opening 9 is provided in a side surface thereof on the opposite side of the rotation center of the revolving drum 3 from the wire body opening 11a. A plate 12 that obstructs the wire body opening 11a is fixed to the wire body opening 11a. The wire body 10a, such as a motor controlling cable 18, that is relayed by a connector 13 is fixed to the plate 12.

The wire body 10b for a peripheral device is made to pass to the inside and the outside of the base 2 through a through-hole 11b passing through the plate 12, without being relayed. Although the wire body 10b for a peripheral device may be a single one, as shown in FIG. 1, a plurality of wires 14a, 14b, 14c, and 14d may be bunched by a conduit 15 having flexibility, such as that made of resin or cloth, e.g., aramid fiber. The conduit 15 itself, when made of resin, has flexibility but has high torsional rigidity, thus being hardly twisted during the motion of the pivot shaft; however, the plurality of thin wires 14a, 14b, 14c, and 14d, which are accommodated in the conduit 15, move in the conduit 15, thereby making it possible to effectively absorb a twist.

The revolving drum 3 has a fixed part 16 that is fixed to an inner ring 7b of the bearing 7, whose outer ring 7a is fixed to the base 2, and the fixed part 16 has a through-hole 17 passing therethrough in the vertical direction, at a position located on an inner side of the inner ring 7b of the bearing 7. The revolving drum 3 supports, thereon, a robot arm (not shown), a drive motor therefor, and a peripheral device.

The speed reduction mechanism 5 is provided with a small gear 19 that is formed of a spur gear fixed to a shaft of the drive motor 4, a large gear 20 that is formed of a spur gear meshed with the small gear 19, an input hypoid gear 21 that is formed integrally with the large gear 20 by using a fitting structure including the fixing bolts, and an output hypoid gear 22 that is meshed with the input hypoid gear 21.

The output hypoid gear 22 is formed of a ring gear fixed to a lower surface of the inner ring 7b of the bearing 7, to which the revolving drum 3 is fixed. Accordingly, the output hypoid gear 22 is fixed to the revolving drum 3 via the inner ring 7b of the bearing 7.

The part obtained by combining the input hypoid gear 21 and the large gear 20 is supported by a cover member 23 that is fixed to a side surface of the base 2, in a manner allowing it to rotate about a horizontal axis by means of bearings (hereinafter, referred to as support bearings) 30. When the cover member 23, to which the part obtained by combining the input hypoid gear 21 and the large gear 20 is attached so as to be capable of rotating, is attached to the side surface of the base 2, the large gear 20 is accommodated in a first closed space 24 that is formed between the base 2 and the cover member 23. In the first space 24, the small gear 19, which is fixed to the shaft of the drive motor 4 fixed to the base 2, is also disposed, thereby allowing the large gear 20 and the small gear 19 to be meshed with each other.

A second space 27 that is closed by a seal member 26 is formed around the output hypoid gear 22, the seal member 26 being disposed between a cylindrical inner surface of the base 2 and a cylindrical member 25 that is fixed to inner surfaces of the inner ring 7b of the bearing 7 and the output hypoid gear 22. The cylindrical member 25 is disposed so as to extend vertically downward such that the center hole of the inner ring 7b of the bearing 7 is extended vertically downward. Accordingly, a hollow portion 31 that communicates from the space in the base 2 to an upper portion of the revolving drum 3 is formed.

As shown in FIG. 2, the drive motor 4 for the pivot shaft is disposed at a position shifted in the horizontal direction from a vertically downward portion of the hollow portion 31. Accordingly, while preventing the hollow portion 31 from being obstructed by the drive motor 4, the cable 18 for the drive motor of the robot and the wire body 10b for a peripheral device can be guided from the wire body opening 11a to the inside of the hollow portion 31 without being disturbed by the drive motor 4 and can be easily wired to the upper portion of the revolving drum 3 via the hollow portion 31.

A through-hole 28 is formed in a wall surface between the first space 24 and the second space 27, thus communicating between both spaces, and the input hypoid gear 21 passes through the through-hole 28 to extend to the inside of the second space 27 and is meshed with the output hypoid gear 22.

A seal member 29 seals between the outer ring 7a and the inner ring 7b of the bearing 7. Accordingly, the space between the outer ring 7a and the inner ring 7b of the bearing 7, the second space 27 where the output hypoid gear 22 and the input hypoid gear 21 are meshed, the first space 24 where the large gear 20 and the small gear 19 are meshed, and the space where the support bearings 30 supporting the input hypoid gear 21 are disposed are all sealed from the outside, and thus, lubricating oil is enclosed therein.

The operation of the thus-configured robot pivot shaft structure 1 of this embodiment will be described below.

According to the robot pivot shaft structure 1 of this embodiment, when the drive motor 4 is actuated to rotate the small gear 19, which is fixed to the shaft, the large gear 20, which is meshed with the small gear 19 in the first space 24, rotates about the horizontal axis, and the input hypoid gear 21, which is fixed to the large gear 20, is rotated about the horizontal axis. Because the input hypoid gear 21 passes through the through-hole 28, extends to the inside of the second space 27, and is meshed with the output hypoid gear 22, the output hypoid gear 22 is rotated about the vertical axis due to the rotation of the input hypoid gear 21.

Because the output hypoid gear 22 is fixed to the revolving drum 3, the power of the drive motor 4 is transferred to the revolving drum 3, and the revolving drum 3 is rotated about the vertical axis with respect to the base 2. Due to the engagement between the small gear 19 and the large gear 20 and the engagement between the input hypoid gear 21 and the output hypoid gear 22, the rotation of the drive motor 4 is transferred to the revolving drum 3 after the rotational speed is reduced in two stages according to the ratios of the numbers of teeth, thereby making it possible to rotate the revolving drum 3 at high torque.

The hollow portion 31, which extends from the inside of the base 2 to the upper portion of the revolving drum 3, is formed by the through-hole 17 of the revolving drum 3, the center hole of the inner ring 7b of the bearing 7, the center hole of the output hypoid gear 22 fixed to the revolving drum 3, and an inner hole of the cylindrical member 25; thus, the wires 10a and 10b, which are hardly affected by the rotation of the revolving drum 3, can be routed by using the path formed by the hollow portion 31.

In particular, because the drive motor 4 is disposed below the revolving drum 3, there is an advantage in that a space in the upper portion of the revolving drum 3 that is used to route the wires 10a and 10b that have passed through the hollow portion 31 of the revolving drum 3 and have been led out upward need not be encroached on by the drive motor 4, thereby making it possible to perform loose routing.

Accordingly, wiring to a mechanical portion or a peripheral device above the revolving drum 3 can be easily performed. Furthermore, because the drive motor 4 is disposed at a position shifted in the horizontal direction from a vertically downward portion of the hollow portion 31, the drive motor 4 does not block the path of the wires 10a and 10b also at a portion below the hollow portion 31. Accordingly, there is an advantage in that it is possible to easily perform wiring of the wires 10a and 10b from the base 2 to a mechanical portion or a peripheral device above the revolving drum 3.

In this embodiment, the input hypoid gear 21 and the large gear 20 are supported by the cover member 23 so as to be capable of rotating by means of the support bearings 30, and the cover member 23 is fixed to the base 2, thereby disposing the large gear 20 between a tooth section of the input hypoid gear 21 and the support bearings 30. Accordingly, the large gear 20, which has a large outer-diameter dimension, can be brought closer to the axis of rotation of the revolving drum 3 than the support bearings 30, which have smaller outer diameters, are. As a result, a cover member 23 that has a size allowing the large gear 20, which has a large outer-diameter dimension, to be accommodated therein need not be disposed at a position away from the axis of rotation of the revolving drum 3, thus leading to an advantage that the base 2 with the cover member 23 attached thereto can be reduced in size.

In this embodiment, because the large gear 20 and the small gear 19 are each formed of a spur gear, there is an advantage in that an axiswise force need not be produced during rotation, at the engagement between the small gear 19 and the large gear 20, and thus an axial force need not be exerted on the shaft of the drive motor 4. Accordingly, the durability of the drive motor 4 can be improved.

In this embodiment, the wire body opening 11a, through which the wires 10a and 10b guided to the base 2 via the hollow portion 31 are led out from the side surface of the base 2 to the outside, is provided; therefore, it is possible to easily perform wiring of the wires 10a and 10b from the outside of the base 2 to an upper portion of the revolving drum 3 through the through-hole 17 of the revolving drum 3, the center hole of the inner ring 7b of the bearing 7, the center hole of the output hypoid gear 22, the cylindrical member 25, and the wire body opening 11a.

In this embodiment, the motor opening 9, through which the drive motor 4 can be taken in and out from the base 2, is provided on the opposite side of the vertical axis, which is the axis of rotation of the revolving drum 3, from the wire body opening 11a, thus leading to an advantage in that attachment/detachment of the drive motor 4 to/from the base 2 can be easily performed through the motor opening 9, thus making it possible to facilitate installation of the drive motor 4 and maintenance work.

As a result, the following aspect is read from the above described embodiment of the present invention.

According to one aspect, the present invention provides a robot pivot shaft structure including: a base; a revolving drum that is supported at an upper portion of the base so as to be rotate about a vertical axis and that has a hollow portion in the vicinity of the vertical axis; a drive motor that rotates the revolving drum; and a speed reduction mechanism that transfers rotation of the drive motor to the revolving drum after reducing the rotational speed thereof, wherein the speed reduction mechanism is provided with a small gear that is fixed to a shaft of the drive motor, a large gear that is meshed with the small gear, an input hypoid gear that is fixed to the large gear, and an output hypoid gear that is formed of a ring gear meshed with the input hypoid gear; the output hypoid gear is fixed to the revolving drum and is disposed in the base; the input hypoid gear and the large gear are supported at a side portion of the base so as to rotate about a horizontal axis; and the drive motor is fixed to the base with being disposed at a position below the revolving drum, the position being shifted in the horizontal direction from a portion vertically below the hollow portion.

According to this aspect, when the drive motor is actuated to rotate the small gear, which is fixed to the shaft, the large gear, which is meshed with the small gear, rotates, and the output hypoid gear, which is meshed with the input hypoid gear, is rotated about the vertical axis via the input hypoid gear fixed to the large gear. Because the output hypoid gear is fixed to the revolving drum, the power of the drive motor is transferred to the revolving drum, and the revolving drum is rotated about the vertical axis with respect to the base.

Due to the engagement between the small gear and the large gear and the engagement between the input hypoid gear and the output hypoid gear, the rotation of the drive motor is transferred to the revolving drum after the rotational speed is reduced in two stages according to the ratios of the numbers of teeth, thereby making it possible to rotate the revolving drum at high torque.

Because a path extending from the inside of the base to a portion above the revolving drum is formed by the hollow portion of the revolving drum and the center hole of the output hypoid gear, which is formed of a ring gear fixed to the revolving drum, a wire body that is hardly affected by the rotation of the revolving drum can be routed by using this path.

In this case, because the drive motor is disposed below the revolving drum, a space for routing the wire body led out upward via the hollow portion of the revolving drum need not be encroached on by the drive motor, thereby making it possible to perform loose routing. Accordingly, wiring to a mechanical portion or a peripheral device above the revolving drum can be easily performed.

Because the drive motor is disposed at a position shifted in the horizontal direction from a portion vertically below the hollow portion, the drive motor does not block the path of the wire body also at a portion below the hollow portion. Accordingly, wiring of the wire body from the base to a mechanical portion or a peripheral device above the revolving drum can be easily performed.

In the above-described aspect, the input hypoid gear and the large gear may be rotatably supported by the base by means of a support bearing; and the large gear may be disposed between a tooth section of the input hypoid gear and the support bearing.

By doing so, the large gear, which has a large outer-diameter dimension, can be brought closer to the axis of rotation of the revolving drum than the support bearing is, the support bearing having a smaller outer diameter than the large gear, and the external dimensions of the base can be reduced.

In the above-described aspect, the large gear and the small gear may be spur gears.

By doing so, because an axial force is not produced at the engagement between the large gear and the small gear, an axial force need not be exerted on the shaft of the motor.

In the above-described aspect, it is also possible to further include an opening for a wire body through which the wire body that is guided to the inside of the base via the hollow portion is led out from a side surface of the base to the outside.

By doing so, it is possible to easily perform wiring of the wire body from the outside of the base to a portion above the revolving drum through the hollow portion of the revolving drum, the center hole of the output hypoid gear, which is formed of a ring gear fixed to the revolving drum, and the opening for the wire body.

In the above-described aspect, it is also possible to further include an opening for a motor through which the drive motor is taken in and out from the base, at the opposite side of the vertical axis from the opening for the wire body.

By doing so, attachment/detachment of the drive motor to/from the base can be easily performed through the opening for the motor, thus making it possible to facilitate installation of the drive motor and maintenance work.

The invention claimed is:

1. A robot pivot shaft structure comprising:
   a base;
   a revolving drum that is supported at an upper portion of the base so as to rotate about a vertical axis and that has a hollow portion in the vicinity of the vertical axis;
   a drive motor that rotates the revolving drum; and
   a speed reduction mechanism that transfers rotation of the drive motor to the revolving drum after reducing the rotational speed of the revolving drum,
   wherein the speed reduction mechanism is provided with a small gear that is fixed to a shaft of the drive motor, a large gear that is meshed with the small gear, an input hypoid gear that is fixed to the large gear, and an output hypoid gear that is formed of a ring gear and that is meshed with the input hypoid gear;
   the output hypoid gear is fixed to the revolving drum and is disposed in the base;
   the input hypoid gear and the large gear are supported at a side portion of the base so as to rotate about a horizontal axis; and
   the drive motor is fixed to the base and disposed at a position below the revolving drum, the position being shifted in the horizontal direction from a portion vertically below the hollow portion,
   wherein the input hypoid gear and the large gear are rotatably supported by the base by means of a support bearing; and
   the large gear is disposed between a tooth section of the input hypoid gear and the support bearing.

2. A robot pivot shaft structure according to claim 1, further comprising an opening for a wire body through which the wire body is guided inside of the base via the hollow portion is led out from a side surface of the base to the outside.

3. A robot pivot shaft structure according to claim 2, further comprising an opening for a motor through which the drive motor is taken in and out from the base, at an opposite side of the vertical axis from the opening for the wire body.

4. A robot pivot shaft structure comprising:
   a base;
   a revolving drum that is supported at an upper portion of the base so as to rotate about a vertical axis and that has a hollow portion in the vicinity of the vertical axis;
   a drive motor that rotates the revolving drum;
   a speed reduction mechanism that transfers rotation of the drive motor to the revolving drum after reducing the rotational speed thereof;
   an opening for a wire body through which the wire body that is guided to the inside of the base via the hollow portion is led out from a side surface of the base to the outside; and
   an opening for a motor through which the drive motor is taken in and out from the base, at the opposite side of the vertical axis from the opening for the wire body,
   wherein the speed reduction mechanism is provided with a small gear that is fixed to a shaft of the drive motor, a large gear that is meshed with the small gear, an input hypoid gear that is fixed to the large gear, and an output hypoid gear that is formed of a ring gear and that is meshed with the input hypoid gear;
   the output hypoid gear is fixed to the revolving drum and is disposed in the base;
   the input hypoid gear and the large gear are supported at a side portion of the base so as to rotate about a horizontal axis; and
   the drive motor is fixed to the base with being disposed at a position below the revolving drum, the position being shifted in the horizontal direction from a portion vertically below the hollow portion.

5. A robot pivot shaft structure according to claim 4,
   wherein the input hypoid gear and the large gear are rotatably supported by the base by means of a support bearing; and
   the large gear is disposed between a tooth section of the input hypoid gear and the support bearing.

6. A robot pivot shaft structure according to claim 1, wherein the large gear and the small gear are spur gears.

* * * * *